(12) United States Patent
Carrabre et al.

(10) Patent No.: US 8,038,753 B2
(45) Date of Patent: Oct. 18, 2011

(54) SYSTEMS FOR REMOVING TOXIC AIRBORNE CONTAMINANTS IN WAXING ENVIRONMENTS

(76) Inventors: James E. Carrabre, Cologne, MN (US); Timothy R. Collins, Waconia, MN (US)

( * ) Notice: Subject to any disclaimer, the term of this patent is extended or adjusted under 35 U.S.C. 154(b) by 355 days.

(21) Appl. No.: 12/238,673

(22) Filed: Sep. 26, 2008

(65) Prior Publication Data
US 2009/0084264 A1    Apr. 2, 2009

Related U.S. Application Data

(60) Provisional application No. 60/975,922, filed on Sep. 28, 2007.

(51) Int. Cl.
A63C 11/00 (2006.01)
A63C 11/08 (2006.01)

(52) U.S. Cl. ............... 55/385.1; 55/385.2; 55/DIG. 18; 280/809

(58) Field of Classification Search ............ 55/385.1, 55/385.2; 15/236.01, 236.05, 236.07; 280/601, 280/620, 809, 813; 118/59, 101, 680, 202, 118/242, 256, 410, 421, 72
See application file for complete search history.

(56) References Cited

U.S. PATENT DOCUMENTS

| | | | | |
|---|---|---|---|---|
| 3,136,659 A | * | 6/1964 | Johnson et al. | 118/680 |
| 3,826,518 A | * | 7/1974 | Hennig | 280/813 |
| 3,912,902 A | * | 10/1975 | Herniter | 219/228 |
| 3,968,345 A | * | 7/1976 | Kollmeder | 219/228 |
| 4,065,214 A | | 12/1977 | Daum et al. | |
| 4,078,780 A | * | 3/1978 | Schwarz | 269/88 |
| 4,089,076 A | * | 5/1978 | Sparling | 7/158 |
| 4,215,947 A | * | 8/1980 | Sparling | 401/125 |
| 4,905,338 A | * | 3/1990 | Mascia | 15/236.05 |
| 5,209,780 A | * | 5/1993 | Partel | 118/59 |
| 5,417,433 A | * | 5/1995 | Phillips | 273/309 |
| 5,441,279 A | * | 8/1995 | Messina | 273/309 |
| 5,562,286 A | * | 10/1996 | Brinket | 273/309 |
| 6,444,002 B1 | * | 9/2002 | Mai | 55/385.1 |
| 7,007,978 B1 | * | 3/2006 | Purdom | 280/809 |
| 2006/0185585 A1 | * | 8/2006 | McLean | 118/101 |

FOREIGN PATENT DOCUMENTS

JP            10-263136        10/1998

OTHER PUBLICATIONS

Search Report & Written Opinion dated May 26, 2009 for International application No. PCT/US2008/011172, filed Sep. 26, 2009.

* cited by examiner

*Primary Examiner* — Duane Smith
*Assistant Examiner* — Minh-Chau Pham
(74) *Attorney, Agent, or Firm* — Leanne Taveggia Farrell; Westman, Champlin & Kelly, P.A.

(57) ABSTRACT

Systems are described for use in removing toxic airborne contaminants from a waxing environment where wax is being applied to sporting equipment. The systems include a base, at least one platform coupled to the base and an airflow generator. The at least one platform is configured to securely receive sporting equipment to be waxed. Each platform includes a first surface that is in contact with the waxing environment, an opposing second surface and at least one opening that extends between the first and second surfaces of each platform. The airflow generator is configured to generate an airflow for pulling harmful airborne contaminants through the at least one opening in each platform in a direction from the first surface to the second surface.

20 Claims, 8 Drawing Sheets

SYSTEMS FOR REMOVING TOXIC AIRBORNE CONTAMINANTS IN WAXING ENVIRONMENTS

CROSS-REFERENCE TO RELATED APPLICATION

The present application is based on and claims the benefit of U.S. provisional patent application Ser. No. 60/975,922, filed Sep. 28, 2007, the content of which is hereby incorporated by reference in its entirety.

BACKGROUND

Fluoropolymers are widely used in industry for a variety of applications. Example applications include mechanical and electrical components; fiberoptics; as a non-stick agent in the manufacturing of cooking utensils and as oil, water and stain repellents in upholstery production. Inhalation of airborne fumes during manufacturing of any of the example applications can cause polymer flume fever. Within hours of exposure to airborne fumes, symptoms of polymer flume fever can include dyspnoea, pyrexia, nausea, vomiting, unproductive cough, pulmonary edema, peripheral blood leucocytosis, hypoxaemia, alveolitis and alveolar collapse. Within days of exposure, reactive airway dysfunction and acute respiratory distress syndrome can occur.

Hydrocarbon based waxes are commonly used in ski waxes. Oftentimes the hydrocarbons are used alone or together in combination with fluorocarbons and other chemical products to reduce the friction between the sporting device and the surface with which it makes contact (snow, water, etc). For example, waxes are often applied to equipment for use in skiing, boarding, bobsledding, rowing, sailing and etc. When wax is applied to sporting equipment, release of the hydrocarbon molecules creates an environment similar to that of smoking. Hydrocarbon levels in these environments are several hundred times more than the acceptable safe limits for inhalation (based on governmental industrial hygiene standards).

Application of waxes to sporting equipment is generally accomplished through application of heat, such as by iron, torch, hot air and etc. Oftentimes, overheating of waxes can occur when applying the waxes to sporting equipment. If waxes containing fluropolymers are overheated, the molecular bond of the fluoropolymer breaks down and a fluorine ion becomes airborne. Free airborne fluorine is toxic and carcinogenic.

In general, application of fluoropolymer and hydrocarbon waxes are accomplished by individuals and/or wax technicians in enclosed spaces in various environments, such as individuals' homes, equipment rental businesses, huts located near recreational areas where the equipment is used and at major sporting competitions, such as the Olympics and World Cup events. In a typical competition scenario, each team is given an enclosed space for applying waxes to their equipment. This space (often an individual room) is an area that is separated from other teams. Privacy in regard to waxing techniques and products are highly desirable and necessary for each team so as to protect individual team waxing strategies. Therefore, a typical wax environment has athletes and wax technicians from the same team sharing the same enclosed space.

At this time, very few international enclosed spaces for waxing have ventilation systems. However, sometimes these enclosed spaces are supplied with a conventional updraft exhaust system. Updraft exhaust systems simply draw toxins into the breathing path of the wax technician and out into an environment external to the wax application environment. Since fluoropolymer particles degrade to produce phosgene, fluorine, hydrofluoric acid and other toxic byproducts, wax fumes are mostly invisible, odorless and tasteless. The wax technician is only aware of the removal of other airborne particles, such as hydrocarbons or smoke, which are toxic in of themselves.

These conventional exhaust systems have proven to remove a high percentage of hydrocarbons as can be seen with the naked eye, however, it is unknown how effective the updraft exhaust system is in removing invisible, odorless and tasteless particles that are also toxic. In particular, it is unknown how effective an updraft exhaust system is in removing fluorine ion particles, which are heavier than ambient air. In addition the external exhausting of these particles poses a substantial health and environmental risk to persons and wildlife in the vicinity of the exhaust ports. Although wax technicians could use respirators when applying fluoropolymer waxes, respirators are cumbersome, hot, uncomfortable and visually impair one's ability to see work in detail. The respirators are also often not maintained adequately in terms of frequency of cartridge filtration changes so as to render them effectively useless. Respirators are also are not fitted properly or maintained in a manner that effectively protects a user.

The discussion above is merely provided for general background information and is not intended to be used as an aid in determining the scope of the claimed subject matter.

SUMMARY

Embodiments describe removing toxic airborne contaminants from a waxing environment where wax is being applied to sporting equipment. Systems include a base, at least one platform coupled to the base and an airflow generator, such as a fan. The at least one platform is configured to securely receive sporting equipment to be waxed. Each platform includes a first surface that is in contact with the waxing environment, an opposing second surface and at least one opening that extends between the first and second surfaces of each platform. The airflow generator is configured to generate an airflow for pulling harmful airborne contaminants through the at least one opening in each platform in a direction from the first surface to the second surface.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments of the disclosure pertain to a point of use system and a centralized system for removing toxic airborne particles, which are bi-products of applying fluoropolymer, hydrocarbon and other friction reducing agents, in waxing applications. For example, one type of waxing application includes applying wax to various types of sporting equipment. In a point of use system, each wax application station is provided with its own internal system for removing toxic airborne particles. In a centralized system, many wax application stations are coupled to a single system for removing toxic airborne particles. In one type of centralized system, a single room could be serviced. In another type of centralized system, an entire facility including multiple rooms could be serviced.

Figure 1:
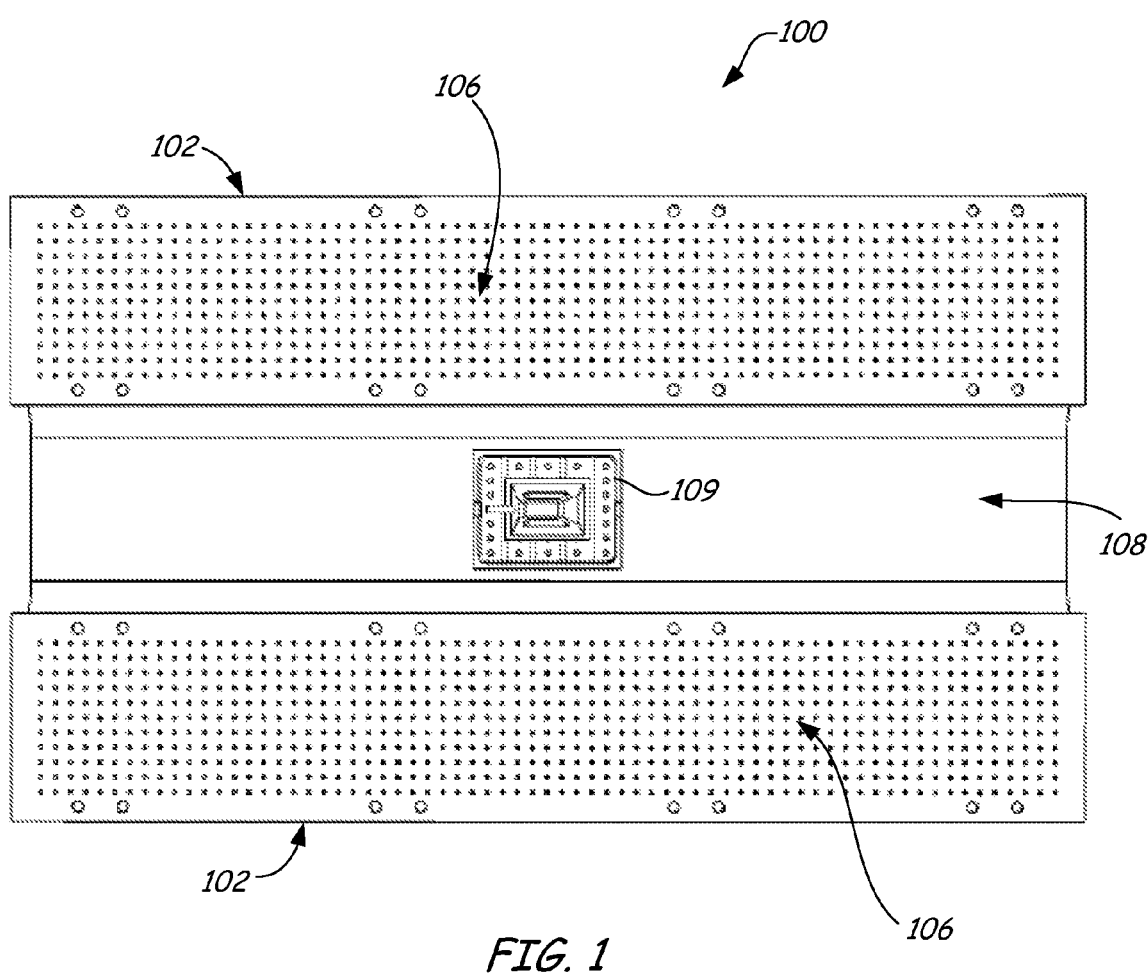
FIG. 1 is a top plan view of a wax application system under one embodiment.

FIG. 1 illustrates a top plan view of a wax application system 100 configured to receive at least one piece of sporting equipment under one embodiment. Wax application system 100 has a wax table 101 that includes at least one platform 102 for use in either a point-of-use system or for a centralized system to remove toxic airborne particles. As illustrated in FIG. 1, wax application system 100 includes a pair of platforms 102. However, it should be realized that wax application system 100 can include a single platform or any number of platforms.

Each platform 102 is configured to receive sporting equipment. For example, each platform can receive a pair of skis, such as downhill, Nordic, Telemark, water or other type of ski. Of course, other types of sporting equipment can also be received by each platform 102, such as various types of sleds, boards, boats and etc.

Each platform 102 includes a plurality of openings or perforations 106. As illustrated in FIG. 1, the perforations 106 are positioned in a grid-like pattern. However, it should be realized that platform 102 can include perforations 106 in any type of format, such as a random format or other type of deliberate format. Perforations 106 are inlets for receiving toxic airborne particles and contaminants that loosen from the wax used in waxing sporting equipment.

Wax application system 100 also includes a concave portion 108 adjacent the at least one platform 102. In the embodiment illustrated in FIG. 1, concave portion is located between the pair of platforms 102. In one embodiment, concave portion 108 can act as a storage area for storing various types of accessories, which a wax technician would need in order to apply wax to sporting equipment. Example accessories include irons or other heat producing tools, wax, sport equipment cleaner, wax remover and etc. As illustrated in FIG. 1 embodiment, concave portion 108 can include a vented iron holder 109 for retaining and holding an iron for waxing. However, the vented iron holder 109 can be located in other position on wax table 101. For example, vented iron holder 109 can be place at either end of wax table 101 or on either side of wax table 101. In another embodiment, concave portion 108 can act as a waste disposal site for collecting wax scrapings after the wax is removed during the process of waxing sporting equipment.

Although not illustrated in FIG. 1, wax application system 100 can also include various attachable accessories to platforms 102. For example, some accessories that are not particularly illustrated in FIG. 1 include a wax holder (such as a wax holder in the form of a storage drawer), an enhancement light for better illuminating the work area, a drink holder, outlets, shields for attaching to the platform or sporting equipment to direct wax particles into concave portion 108 and etc.

Figure 2:
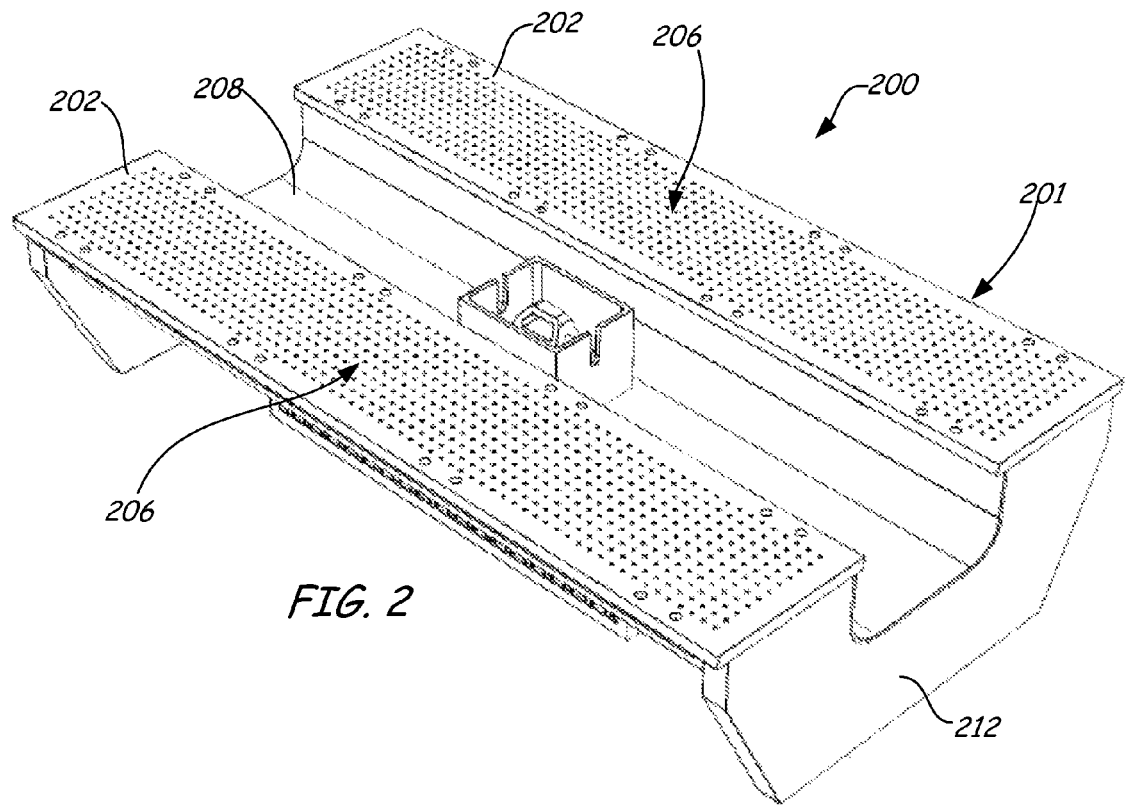
FIG. 2 is a top perspective view of a wax application system under another embodiment.
Figure 3:
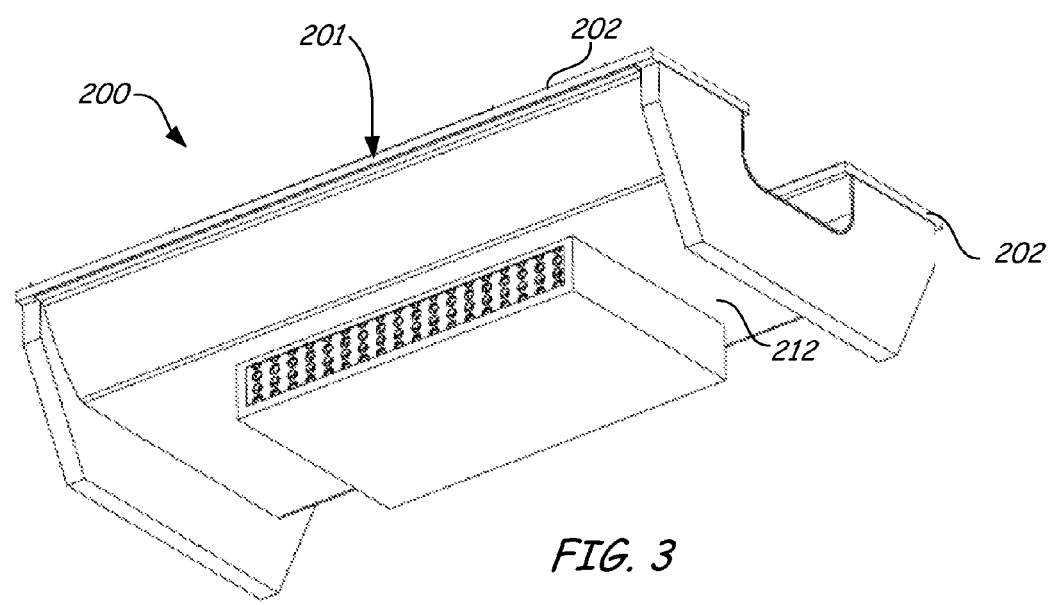
FIG. 3 is a bottom perspective view of the wax application system in FIG. 2.

FIG. 2 illustrates a top perspective view of a wax application system 200 including a wax table 201 and FIG. 3 illustrates a bottom perspective view of wax application system 200 including wax table 201 under one embodiment. FIGS. 2 and 3 are illustrative of a point-of-use system for removing toxic airborne particles or contaminants during the process of applying wax to sporting equipment. Similar to FIG. 1, wax application system 200 includes wax table 201 having a pair of platforms 202, a plurality of perforations 206 in the platforms 202 and a concave portion 208. Unlike the illustration of FIG. 1, the embodiment illustrated in FIG. 2 includes a base 212.

Base 212 includes a plurality of components for removing toxic airborne contaminants from the work area of the wax application system 200. In wax application system 200, the work area, for example, is platform 202 or an area near platform 202. The side view of wax application system 200 in FIG. 4 specifically illustrates the components for removing the toxic airborne contaminants, which are in dashed lines. Base 212 includes a plenum 218, a blower fan 220, a pollution control device 222 and at least one filter 224.

Figure 4:
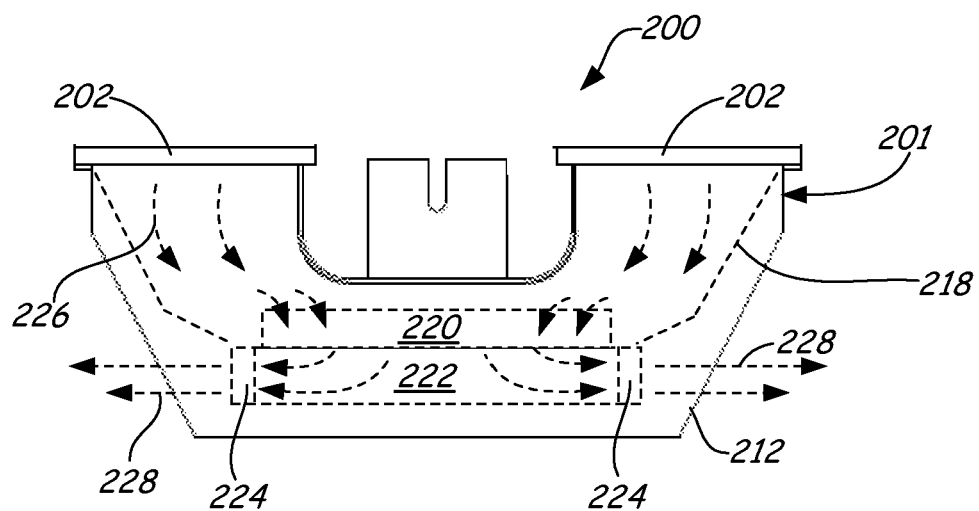
FIG. 4 is a side view of the wax application system illustrated in FIGS. 2 and 3.

Plenum 218 receives an airstream 226 contaminated with toxic airborne particles through perforations 206 (FIG. 2) in platform 202. The airstream 226 is evacuated down and through perforations 206 in platform 202 by blower fan 220. In other words, blower fan 222 evacuates the airstream 226 contaminated by toxic airborne particles down and away from a wax technician who is applying wax to sporting equipment 210. In one embodiment, blower fan 220 can be an axial fan that is able to create a venturi "exhaust." Such a fan is suitable for a system where the distance from inlet source (i.e., perforations 206 in platform 202) to a clean airstream outlet is short. Such is the case in a point-of-use system as illustrated in FIGS. 2-4.

After exiting plenum 218, the airstream 226 that is contaminated by toxic airborne particles enters an air pollution control device 222 for removing the toxic particulates. In one embodiment, air pollution control device 222 can be a wet scrubber, such as a water outlet seal scrubber. In general, a wet scrubber uses a liquid to scrub unwanted particles from a gas stream. In an alternative embodiment, air pollution control device 222 can be a dry scrubber. Regardless of the type of scrubber, air pollution control device 22 should allow for maximum capture of toxic airborne particles, of which scrubbers are good examples.

To wet scrub, toxic airborne particles are contacted with a wet scrubbing solution. Solutions can be as simple as water or can be complex solutions of reagents that specifically target certain types of particles. For example, the wet scrubbing solution can be a reagent that specifically targets fluorine ions. The removal efficiency of a wet scrubber improves by increasing the amount of time the airstream is in the scrubber or by increasing a surface area of the scrubber solution by using a spray nozzle, packed tower objects or an aspirator. A dry or semi-dry scrubbing system, unlike the wet scrubber, does not saturate with moisture while the flue gas stream is being treated. In some cases no moisture is added, while in other cases, only the amount of moisture that can be evaporated in the gas stream without condensing is added. Therefore, dry scrubbers do not have the wastewater handling or disposal requirements as does a wet scrubber.

Figure 5:
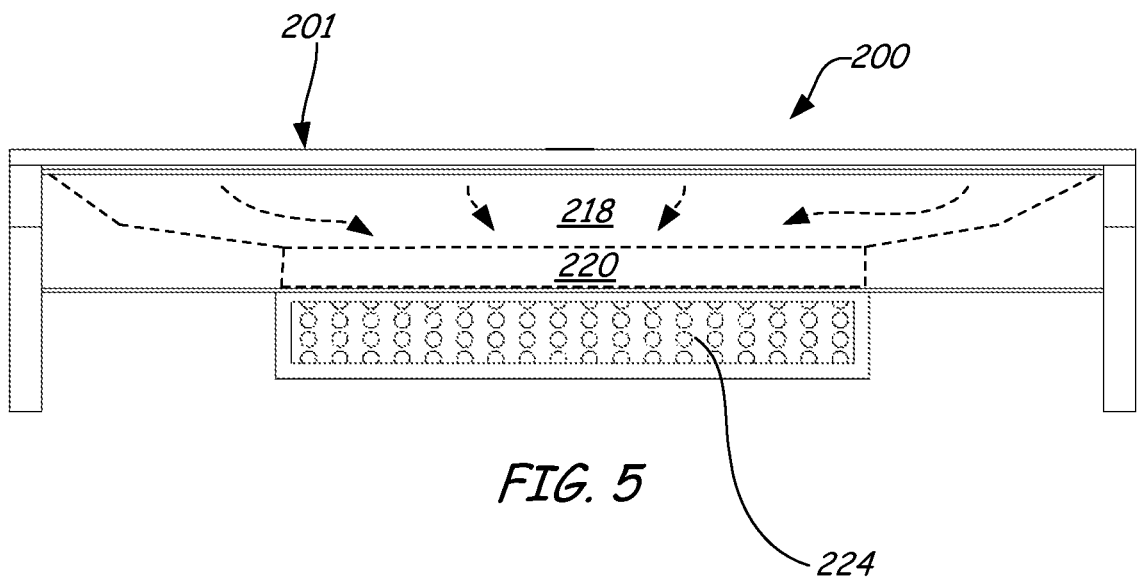
FIG. 5 is a front view of the wax application system illustrated in FIGS. 2-4.

After the airstream 226 has been treated by air pollution control device 222, the airstream 226 is allowed to exit to the wax application environment through another air pollution control device, at least one filter 224. As illustrated in FIG. 4, wax application system 200 includes a pair of filters 224. A pair of filters allows two clean airstreams 228 to exit back into the environment where waxing is being performed in two different outputs. As better illustrated in the front of view of wax application system 200 in FIG. 5, filter 224 is exposed to the environment in which waxing is being performed.

In one embodiment, filters 224 are HEPA (high efficiency particulate air filter). This type of air filter can remove at least 99.97% of airborne particles 0.3 μm in diameter. Particles of this size are the most difficult to filter. Particles that are larger or smaller are filtered with an even higher efficiency. Other types of filters can be used for filters 224. In another embodiment, filters 224 can be UPLA (ultra low penetration air filter). An ULPA filter can theoretically remove at least 99.999% of dust, pollen, mold, bacteria and any airborne particles with a size of 0.12 μm or larger from an airstream.

The clean airstreams 228 exit the filters 224 and enter back into the wax application environment. Wax application system 200 allows all exhausted air that was pulled down and away from the wax technician to be returned into the wax application environment. Such a system brings considerable efficiency to an air management system because very little to no make up air is needed. The capacity for the wax application environment to be reconditioned by heating or cooling is greatly minimized. In addition, by returning all exhausted air into the wax application environment, people and wildlife that could be exposed to externally exhausted air that is blown out of such environments are protected.

Figure 6:
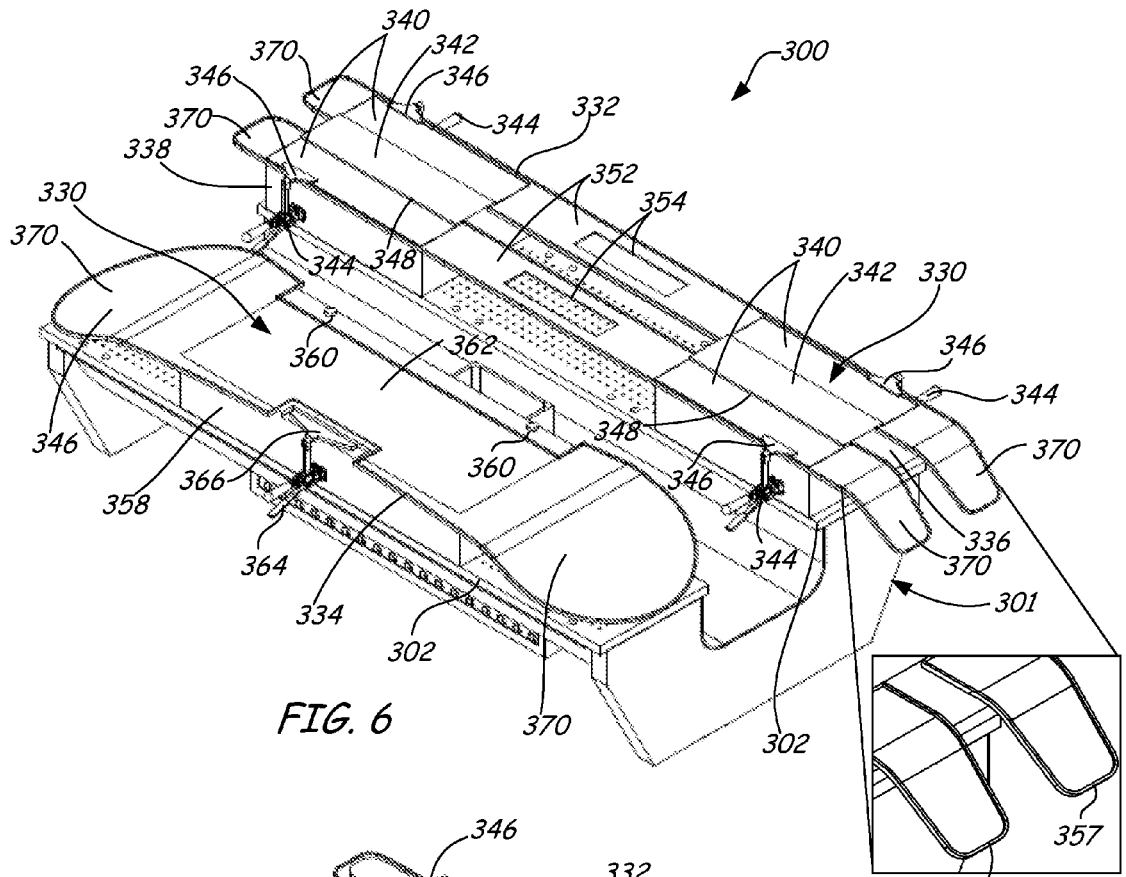
FIG. 6 is a top perspective view of a wax application system under another embodiment.

FIG. 6 illustrates a top perspective view of wax application system 300 including a wax table 301 under another embodiment. In the FIG. 6 embodiment, wax application system 300 include wax table 301, which is similar to wax table 201. However, in wax application system 300, coupled to each platform 302 is a support structure 230 for supporting sporting equipment to be waxed. On one of the two platforms 302, the support structure 330 includes a ski support structure 332. Ski support structure 332 is configured to support a pair of skis for waxing. On the other of the two platforms 302, the support structure 330 includes a snowboard support structure 334. Snowboard support structure 334 is configured to support a snowboard for waxing.

Each of support structures 330 is removable from platforms 302. Therefore, in one embodiment, it is possible for sporting equipment to be waxed on wax table 301 without the need for support structures 330. In other embodiments, ski support structure 332 and snowboard support structure can be swapped such that platform 302 can both be coupled to ski support structures 332 or both be coupled to snowboard support structures 334.

Figure 7:
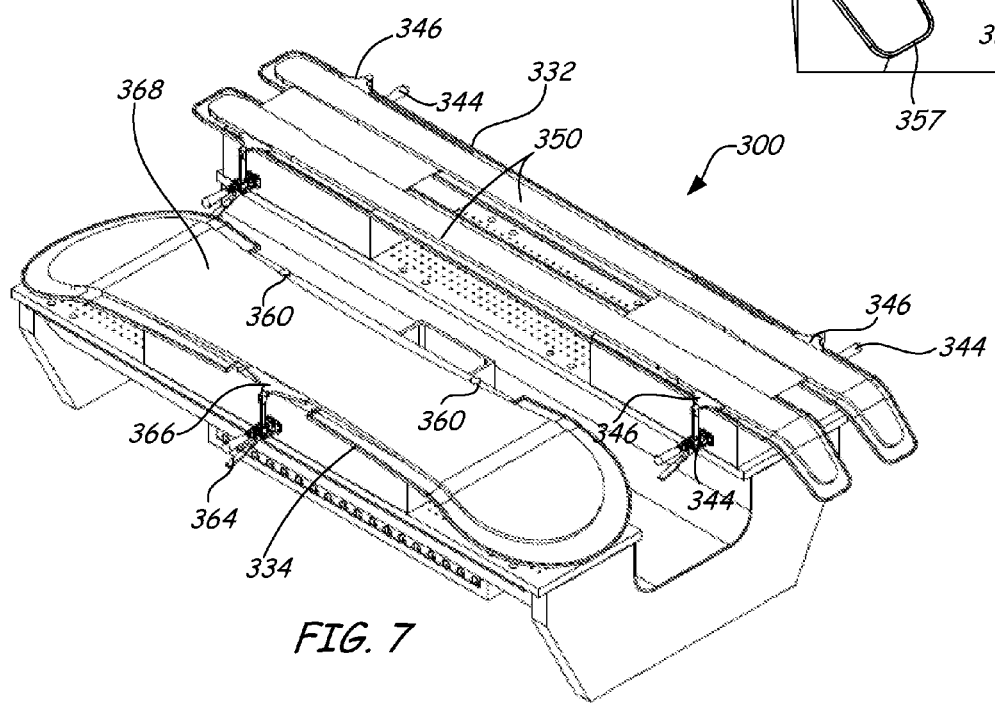
FIG. 7 is a top perspective view of the wax application system illustrated in FIG. 6 including sporting equipment.

Ski support structure 332 includes a first support block 336 and a second support block 338. Both first and second support blocks 336 and 338 include tracks 340 for holding skis. Tracks 340 are recessed from a raised top surface 342 on each block by a surface 348. Each track 340 includes a corresponding clamp 344. Each clamp 344 includes a guide 346. A ski is placed on support blocks 336 and 338 between surface 348 and guide 346. The distance in which guide 346 is spaced apart from an edge of block 336 or 338 depends on the width of a ski and can be adjusted to accommodate different ski widths. Clamp 344 provides a force to push an edge of a ski into surface 348 to hold each ski in place. As illustrated in the top perspective view of wax application system 300 in FIG. 7, each guide 346 of each clamp 344 pushes each ski 350 into each surface 348 that defines a track 340 to hold the ski in place.

Interior beams 352 extend between first support block 336 and second support block 338 and include openings 354 that can accommodate a binding on a ski. Exterior beams 356 extend outwardly from outer ends of both support block 336 and 338 and are shaped in accordance with each end of a ski. Both interior beams 352 and exterior beams 354 provide additional support to skis 350 when waxing. In addition, interior beams 352 and exterior beams 356 include deflectors along the edge of beams 352 and 356. For example, as illustrated in FIG. 6, the cantilevered end of exterior beam 356 is enlarged to illustrate deflectors 357. Each beam 354 and 356 includes can include a deflector 357 that is formed with the edges of beams 354 and 356 and protrudes from a surface of the beam towards the ski with which it supports. In addition, support blocks 336 and 338 can include an edge deflector. Deflectors 357 provide protection in the case where a user uses powdered wax stock. Deflectors prevent powder from being sucked through perforations in wax 301 table by the downdraft system prior to the user having the chance to heat the powders for application to the surface of the sporting equipment. Deflectors 357 can have a squared shape (as is illustrated in FIG. 6), a radius of curavature or other type of shape.

Snowboard support structure 334 includes a single support block 358. Support block 358 includes a pair of protrusions 360. Protrusions 360 are raised from a top surface 362 on support block 358. Coupled to support block 358 includes a clamp 364. Each clamp 364 includes a guide 366. A snowboard is placed on support block 358 between protrusions 360 and guide 366. The distance in which guide 346 are spaced apart from an edge of block 358 depends on the width of the snowboard and can be adjusted to accommodate different snowboard widths. Clamp 364 provides a force to push an edge of the snowboard into protrusions 360 to hold the snowboard in place. As illustrated in the top perspective view of wax application system 300 in FIG. 7, guide 366 of clamp 364 pushes snowboard 368 into protrusions 360 to hold snowboard 368 in place.

At each end of support block 358, exterior beams 370 extend outwardly from support block 358. Exterior beams 370 are shaped in accordance with each end of a snowboard. Beams 370 provide additional support to snowboard 368 when waxing. As discussed above, exterior beams 370 can include deflectors along the edge of beams 370. Each deflector is formed with the edges of beams 370 and protrudes from a surface of the beam towards the board with which it supports. In addition, support block 358 can also include an edge deflector. Deflectors 357 provide protection in the case where a user uses powdered wax stock. Deflectors prevent powder from being sucked through perforations in wax 301 table by the downdraft system prior to the user having the chance to heat the powders for application to the surface of the sporting equipment. Deflectors 357 can have a squared shape, a radius of curavature or other type of shape.

Figure 8:
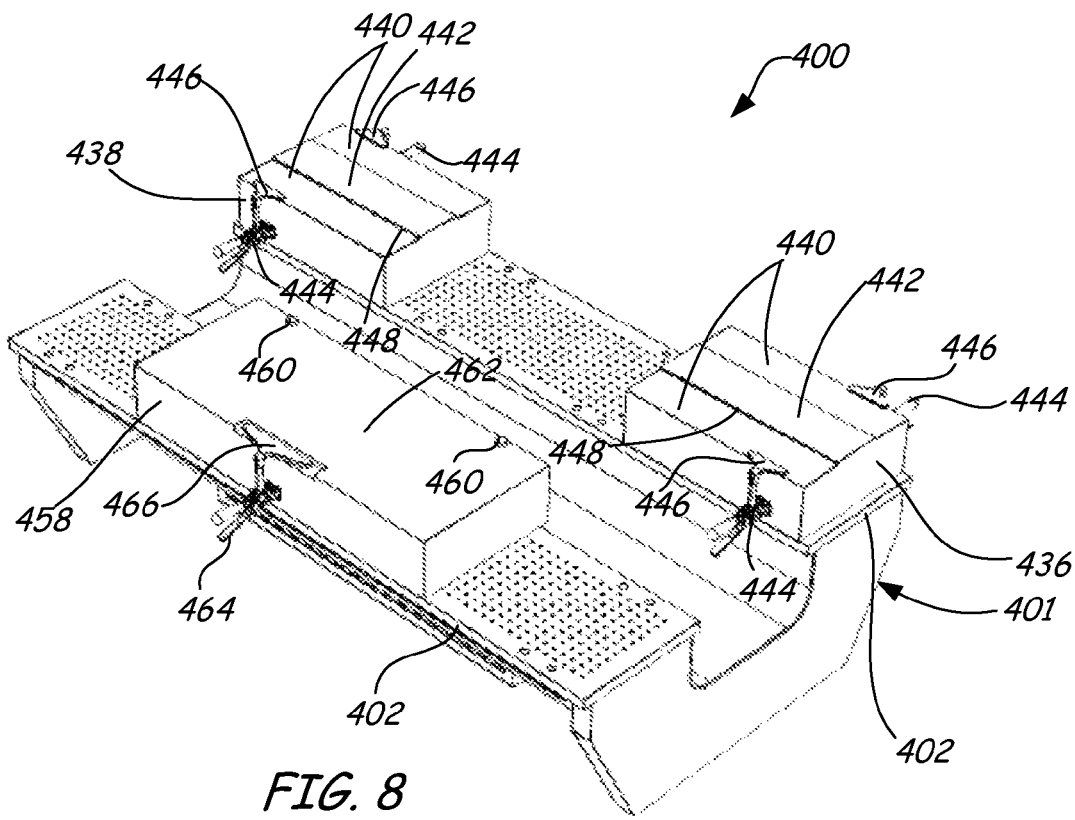
FIG. 8 is a top perspective view of a wax application system under another embodiment.
Figure 9:
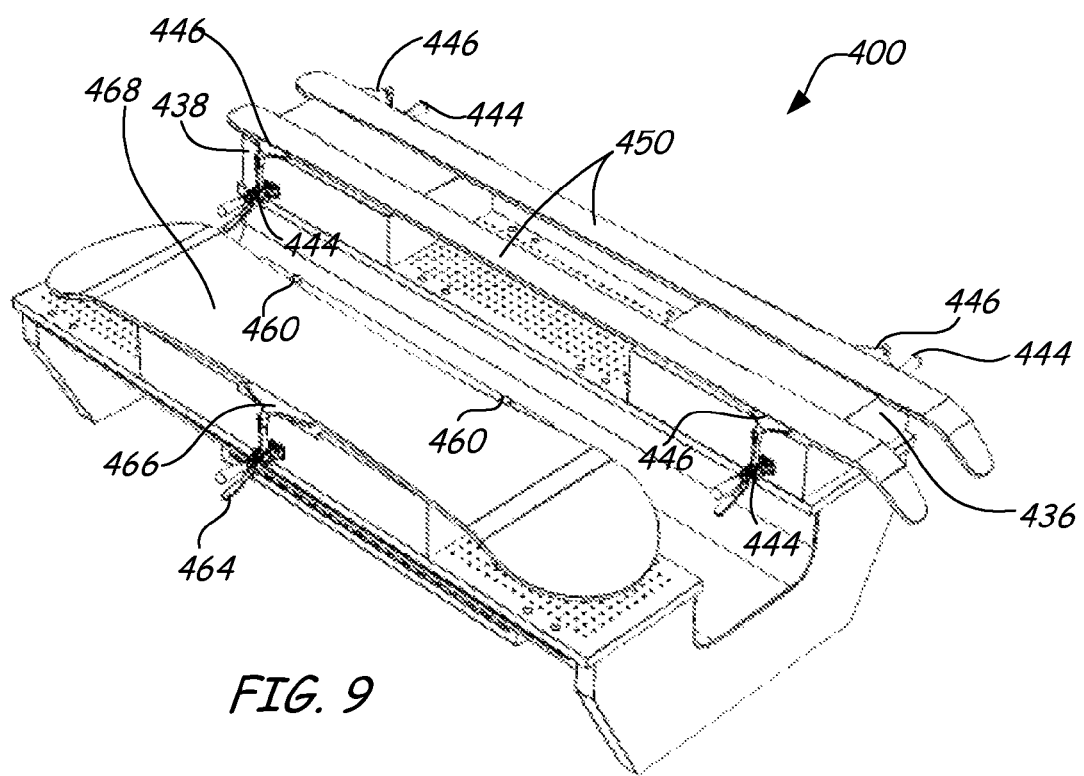
FIG. 9 is a top perspective view of the wax application system illustrated in FIG. 8 including sporting equipment.

FIG. 8 illustrates a top perspective view of wax application system 400 including a wax table 401 under another embodiment. In the FIG. 8 embodiment, wax application system 400 includes wax table 401, which is similar to wax tables 201 and 301. However, in wax application system 400, coupled to one of the platforms 402 are a first support block 436 and a second support block 438 for supporting sporting equipment to be waxed. The first and second support blocks 436 and 438 are for supporting skis 450 as illustrated in FIG. 9. Coupled to the other of the two platforms 402 is a single support block 458 to support a snowboard for waxing.

Both first and second support blocks 436 and 438 include tracks 440 for holding skis. Tracks 440 are recessed from a raised top surface 442 on each block by a surface 448. Each track 440 includes a corresponding clamp 444. Each clamp 444 includes a guide 446. The distance in which guide 446 are spaced apart from an edge of block 436 or 438 depends on the width of a ski and can be adjusted to accommodate different ski widths. Clamp 444 provides a force to push an edge of a ski into surface 448 to hold each ski in place. As illustrated in the top perspective view of wax application system 400 in FIG. 9, each guide 446 of each clamp 444 pushes each ski 450 into each surface 448 that defines each track 440 to hold each ski in place.

Support block 458 includes a pair of protrusions 460. Protrusions 460 are raised from a top surface 462 on support block 458. Coupled to support block 458 includes a clamp 464. Each clamp 464 includes a guide 466. The distance in which guide 446 are spaced apart from an edge of block 458 depends on the width of the snowboard and can be adjusted to accommodate different snowboard widths. Clamp 464 provides a force to push an edge of the snowboard into protrusions 460 to hold the snowboard in place. As illustrated in the top perspective view of wax application system 400 in FIG. 9, guide 466 of clamp 464 pushes snowboard 468 into protrusions 460 to hold snowboard 468 in place.

It should be realized that the clamps illustrated in FIGS. 5-9 are exemplary. Other types of clamps and vises can be used to support and secure sporting equipment to the platforms of the wax table or to the support blocks as illustrated. For example, some types of clamps or vises have integrally formed supports for sporting equipment. These types of clamps or vises can be used in combination the platforms or support blocks to retain the sporting equipment.

Figure 10:
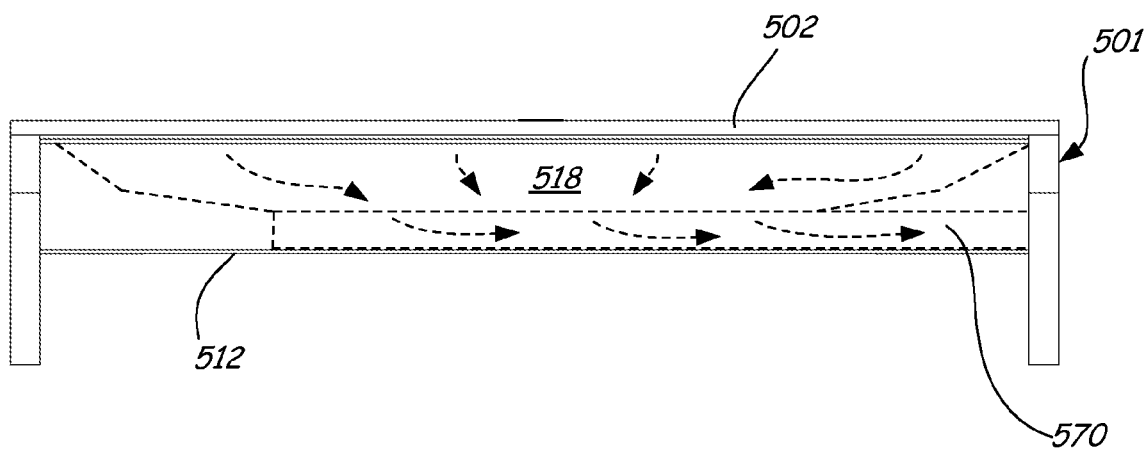
FIG. 10 is a front view of a wax table for use in a central pollution control system under one embodiment.
Figure 11:
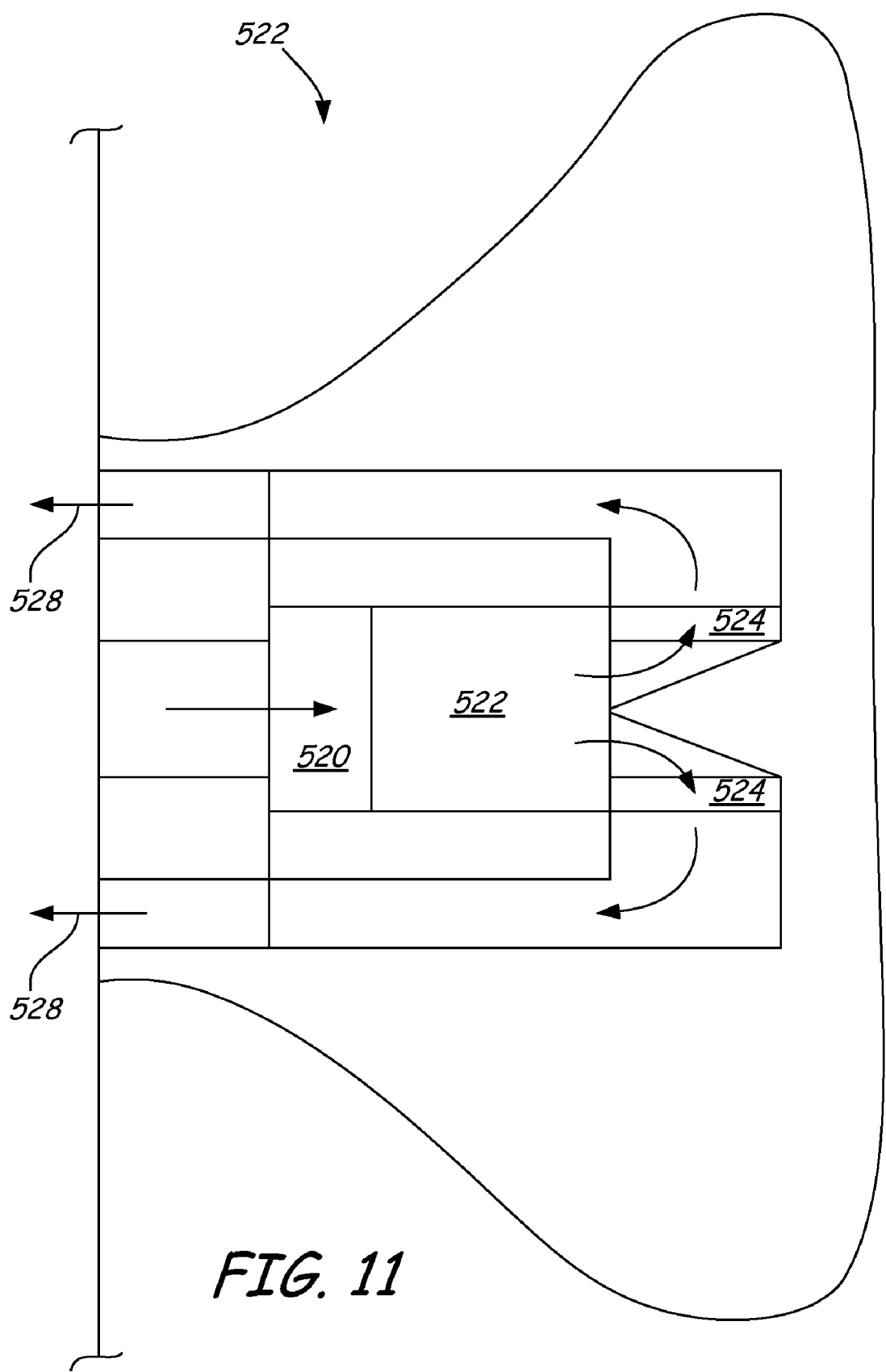
FIG. 11 is a schematic block diagram illustrating a central pollution control system under one embodiment.

FIG. 10 is a front view of wax table 501 under yet another embodiment. The wax table 501 in FIG. 10 is for use in a centralized wax application system for removing toxic airborne particles during the process of applying wax to sporting equipment. Similar to wax table 201 in FIG. 2, wax table 501 includes a pair of platforms 502, a plurality of perforations (not illustrated) in the platforms 502 and a concave portion (also not illustrated). Like wax table 201 in FIG. 2, the wax table 501 illustrated in FIG. 10 is configured to receive sporting equipment to be held in place on platforms 502. Also, like FIG. 2, wax table 501 includes a base 512. However, base 512 includes components different from those components in base 212 of wax table 201. In particular, base 512 of wax table 501 includes a plenum 518 and ducting 370. Plenum 518 receives an airstream contaminated by toxic airborne particles from the process of waxing sporting equipment through perforations in platforms 502. The contaminated airstream is then directed through ducting 570 to a central pollution control system. Together the wax table 501 and the central pollution control system form the embodiment of a centralized wax application system.

In one aspect of a centralized wax application system, a central pollution control system is coupleable to ducting 570 in multiple different wax tables 501 in a single room. Such a central pollution control system 572 is illustrated in FIG. 1. In FIG. 1, central pollution control system 572 receives an inlet airstream 526 contaminated with toxic airborne particles from the wax tables 501. The inlet airstream 526 is delivered to the central pollution control system 572 with a blower fan 520. In one embodiment, blower fan can be a centrifugal blower. The centrifugal blower would include a flow rate capacity as required per the amount of wax tables 501 that are in the room. In particular, blower 520 would have a high enough flow rate capacity to pull contaminated airstreams 526 through perforations in the platforms of the wax tables 501 and into an air pollution control device 522 in central pollution control system 572 for removal of harmful particulates. Example air pollution control devices were discussed above in regards to FIGS. 4 and 5. After the airstream is cleaned in the air pollution control device 522, the airstream is directed through at least one filter 524. The cleaned airstream 528 is then returned to the wax application room or environment.

Figure 12:
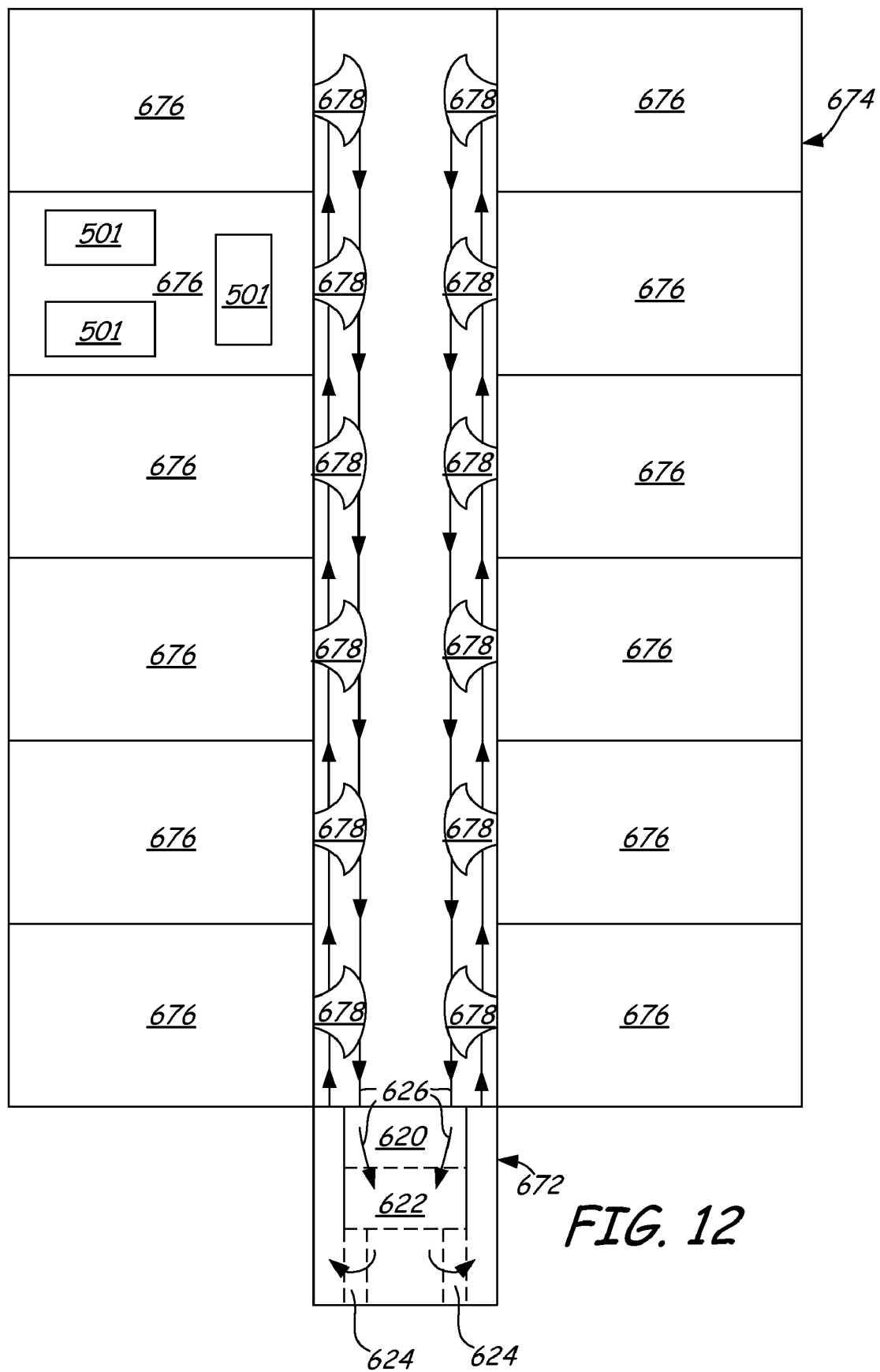
FIG. 12 is a schematic block diagram illustrating a central pollution control system under another embodiment.

In another aspect of a centralized wax application system, a central pollution control system 672 services an entire facility 674 including multiple rooms 676 having multiple wax tables 501 as illustrated in FIG. 12. Each wax application room 676 includes a hub 678. Each hub 678 provides a path for a contaminated airstream 626 to be received by central air pollution control system 672. The path provided by each hub 678 is coupled to ducting (i.e., ducting 570 in FIG. 5) of each wax table 501. In FIG. 12, central pollution control system 672 receives an inlet airstream 626 contaminated with toxic airborne particles from the multiple rooms 676 having multiple wax tables 501. The inlet airstream 626 is delivered to the central pollution control system 672 with a blower fan 620. In one embodiment, blower fan is a regenerative blower. A regenerative blower is a multistage blower capable of accommodating more airflow capacity as the use of more wax tables 501 are added to a facility. The blower fan evacuates an airstream 626 contaminated with toxic airborne particles through perforations in each workstations platform. The blower fan forces the airstream 626 containing toxic airborne particles down and away from a wax technician who is applying wax to sporting equipment and into an air pollution control device 622 in central pollution control system 672 for removal of harmful particulates. Example air pollution control devices were discussed above in regards to FIGS. 4 and 5.

After the airstream 626 is cleaned in the air pollution control device 622, the airstream is directed through at least one filter 624. The cleaned airstream 628 is then returned to each hub 678 and into each wax application room 676.

As previously discussed, filters 524 and 624 can be any of a variety of different filters including HEPA or ULPA. In addition, air pollution control device can be a variety of types of devices including a wet or dry scrubber. It should be noted that other types of air pollution control devices can also be used. For example, cyclones, incinerators, catalytic reactors, bag houses, electrostatic precipitators adsorption and absorption equipment can be used.

Although the present invention has been described with reference to preferred embodiments, workers skilled in the art will recognize that changes may be made in form and detail without departing from the spirit and scope of the invention.

What is claimed is:

1. A system that removes toxic airborne contaminants from a waxing environment, the system comprising:
    a base;
    at least one platform located in a wax environment polluted with harmful airborne contaminates and coupled to the base, the at least one platform configured to support sporting equipment as it receives an application of wax and includes a first surface that is in contact with the waxing environment, an opposing second surface and at least one opening that extends between the first and second surfaces of each platform;

at least one support structure coupleable to at least a portion of the first surface of the platform and including a sporting equipment receiving surface for elevating sporting equipment a spaced distance from the first surface of the at least one platform; and a fan configured to generate an airflow for pulling the harmful airborne particles through the at least one opening in each platform in a direction from the first surface to the second surface.

2. The system of claim 1, wherein the base is configured to house the fan.

3. The system of claim 1, wherein the fan is positioned remotely from the base and the at least one platform.

4. The system of claim 1, further comprising at least one air pollution control device configured to remove the harmful airborne contaminants from the airflow such that the airflow can be introduced back into the wax environment.

5. The system of claim 4, wherein the base is configured to house the fan, the at least one air pollution control device and at least one outlet for introducing the airflow back into the wax environment.

6. The system of claim 4, wherein the fan, the at least one air pollution control device and at least one outlet for introducing the airflow back into the wax environment are remotely located from the base and the at least one platform.

7. The system of claim 4, wherein the at least one air pollution control device comprises one of a wet and dry scrubber.

8. The system of claim 4, wherein the at least one air pollution control device comprises a filter.

9. The system of claim 4, wherein the at least one air pollution control device comprises a first and a second air pollution control device, the first air pollution control device receives the contaminated airflow from the waxing environment to remove harmful contaminants and the second air pollution control device receives the airflow from the first air pollution control device to further remove any remaining harmful contaminants in the airflow.

10. The system of claim 9, wherein the first air pollution control device comprises one of a wet and dry scrubber and the second air pollution control device comprises a filter.

11. The system of claim 10, wherein the second air pollution control device comprises a first and second filter, the first filter receives a portion of the airflow from the first air pollution control device before the portion of the airflow is introduced back into the waxing environment at a first outlet and the second filter receives a remaining portion of the airflow from the first air pollution control device before the remaining portion of the airflow is introduced back into the wax environment at a second outlet.

12. The system of claim 1, wherein the at least one opening comprises a plurality of perforations.

13. A system for use in removing toxic airborne contaminants from a waxing environment, the system comprising:

at least one wax table configured to support sporting equipment during the application of wax, the wax table comprising:

at least one platform including a first surface that is exposed to the waxing environment where wax is being applied to sporting equipment, an opposing second surface and at least one opening that extends between the first and second surfaces of each platform;

at least one support structure coupled to at least a portion of the first surface of the platform and including a sporting equipment receiving surface for elevating the sporting equipment a spaced distance from the first surface of the at least one platform;

an airflow generator for forming an airflow to pull harmful airborne contaminants through the at least one opening in each platform in a direction from the first surface to the second surface;

at least one air pollution control device for removing the harmful airborne contaminants from the airflow; and an outlet for exhausting the airflow cleaned by the at least one air pollution control device back into the waxing environment.

14. The system of claim 13, wherein the at least one support structure comprises a removable support structure for removably supporting and securing the sporting equipment to the support structure.

15. The system of claim 13, wherein the at least one support structures comprises a first support block spaced apart from a second support block, wherein each sporting equipment receiving surface on each support block includes:

a pair of tracks recessed from a top surface of each support block by a surface that defines the track;

a corresponding clamp for holding each support block on the at least one platform, each corresponding clamp having a guide; and wherein a distance between an edge of the support block and the guide can be adjusted to apply pressure on an edge of the sporting equipment to force the sporting equipment against the surface that defines the track.

16. The system of claim 15, wherein the at least one support structure comprises at least one interior beam extending between the first support block and the second support block for supporting the sporting equipment.

17. The system of claim 13, wherein the at least one support structure comprises a single support block including:

a pair of protrusions that protrude from a top surface of the single support block;

a corresponding clamp having a guide; and wherein a distance between an edge of the single support block and the guide can be adjusted to apply pressure on an edge the sporting equipment to force the sporting equipment against the protrusions.

18. A method comprising:

applying wax to a surface of sporting equipment in a waxing environment, the sporting equipment being supported by at least one platform including a top surface that is in contact with the waxing environment, an opposing bottom surface and at least one opening that extends between the top and bottom surfaces of each platform;

generating an airflow for pulling harmful airborne contaminants through the at least one opening from the waxing environment;

guiding the airflow containing harmful contaminants to at least one air pollution control device; and removing harmful airborne contaminants from the airflow with the at least one air pollution control device such that the airflow can be introduced back into the waxing environment.

19. The method of claim 18, wherein removing harmful airborne contaminants from the airflow with the at least one air pollution control device comprises removing harmful airborne contaminants from the airflow with a first air pollution control device and further removing any remaining harmful contaminants in the airflow with a second air pollution control device.

20. The method of claim 19, wherein the second air pollution control device includes a first and second filter, the first filter receiving a portion of the airflow from the first air pollution control device before the portion of the airflow is introduced back into the waxing environment at a first outlet and the second filter receiving a remaining portion of the airflow from the first air pollution control device before the remaining portion of the airflow is introduced back into the wax environment at a second outlet.

* * * * *

UNITED STATES PATENT AND TRADEMARK OFFICE
CERTIFICATE OF CORRECTION

| | |
|---|---|
| PATENT NO. | : 8,038,753 B2 |
| APPLICATION NO. | : 12/238673 |
| DATED | : October 18, 2011 |
| INVENTOR(S) | : James E. Carrabre et al. |

Page 1 of 1

It is certified that error appears in the above-identified patent and that said Letters Patent is hereby corrected as shown below:

Column 10,
Line 21, Claim 15, delete "structures" and insert --structure--.

Signed and Sealed this
Sixth Day of March, 2012

David J. Kappos
*Director of the United States Patent and Trademark Office*